United States Patent
Lin

(10) Patent No.: US 9,845,541 B2
(45) Date of Patent: *Dec. 19, 2017

(54) MODULARIZED HEALTH GAS GENERATOR

(71) Applicant: Hsin-Yung Lin, Shanghai (CN)

(72) Inventor: Hsin-Yung Lin, Shanghai (CN)

( * ) Notice: Subject to any disclaimer, the term of this patent is extended or adjusted under 35 U.S.C. 154(b) by 16 days.

This patent is subject to a terminal disclaimer.

(21) Appl. No.: 14/553,132

(22) Filed: Nov. 25, 2014

(65) Prior Publication Data
US 2015/0144482 A1    May 28, 2015

(30) Foreign Application Priority Data
Nov. 28, 2013 (CN) .......................... 2013 1 0619136

(51) Int. Cl.
| | |
|---|---|
| C25B 9/04 | (2006.01) |
| C25B 9/18 | (2006.01) |
| C25B 1/04 | (2006.01) |
| C25B 9/06 | (2006.01) |

(52) U.S. Cl.
CPC .............. *C25B 9/18* (2013.01); *C25B 1/04* (2013.01); *C25B 9/04* (2013.01); *C25B 9/06* (2013.01); *Y02E 60/366* (2013.01)

(58) Field of Classification Search
None
See application file for complete search history.

(56) References Cited

U.S. PATENT DOCUMENTS

| | | | | |
|---|---|---|---|---|
| RE32,077 E | * | 2/1986 | deNora | C25B 1/46 204/260 |
| 5,082,544 A | * | 1/1992 | Willey | C25B 15/00 204/270 |
| 5,690,797 A | * | 11/1997 | Harada | C25B 1/12 204/228.5 |
| 5,733,422 A | * | 3/1998 | Lin | C25B 15/02 204/228.2 |
| 5,888,361 A | * | 3/1999 | Hirai | C25B 1/04 118/429 |
| 6,630,061 B2 | * | 10/2003 | Lee | C25B 1/04 204/239 |
| 7,273,541 B2 | * | 9/2007 | Choban | C25B 3/00 204/242 |

(Continued)

FOREIGN PATENT DOCUMENTS

| | | |
|---|---|---|
| CN | 2149405 Y | 12/1993 |
| CN | 2231955 Y | 7/1996 |

(Continued)

*Primary Examiner* — Harry D Wilkins, III
(74) *Attorney, Agent, or Firm* — Foster Pepper PLLC

(57) ABSTRACT

The present invention discloses a modular health gas generator, more particularly, to a modular health gas generator with an automatic circulation and a cooling function. Then, the gas production rate of the hydrogen-oxygen gas can be controlled by a plurality of freely detachable electrolytic tanks. The invention comprises an inner tank and the plurality of detachable electrolytic tanks. In application, a hollow portion of each electrolytic tank can be inputted or supplied the liquid water from the inner tank. The liquid water is electrolyzed in the electrolytic tank to generate the hydrogen-oxygen gas and be output to the inner tank, and then the hydrogen-oxygen gas will be further outputted through a gas outlet of the inner tank.

17 Claims, 12 Drawing Sheets

(56) References Cited

U.S. PATENT DOCUMENTS

| | | | | |
|---|---|---|---|---|
| 9,150,972 | B2* | 10/2015 | Vargas | C25B 9/20 |
| 2004/0038096 | A1* | 2/2004 | Chou | C25B 15/02 |
| | | | | 429/413 |
| 2007/0151865 | A1* | 7/2007 | Shimko | C25B 1/10 |
| | | | | 205/628 |
| 2008/0202921 | A1* | 8/2008 | Wilkinson | C25B 1/04 |
| | | | | 204/247 |
| 2010/0086824 | A1* | 4/2010 | Homel | C25B 1/00 |
| | | | | 429/406 |
| 2010/0275859 | A1* | 11/2010 | Klotz | C25B 1/06 |
| | | | | 123/3 |
| 2010/0276278 | A1* | 11/2010 | Bender | C25B 1/06 |
| | | | | 204/270 |
| 2010/0300381 | A1* | 12/2010 | Harper | C25B 1/08 |
| | | | | 123/3 |
| 2011/0017607 | A1* | 1/2011 | Moon | C25B 1/04 |
| | | | | 205/628 |
| 2011/0203917 | A1* | 8/2011 | Shmueli | C25B 1/06 |
| | | | | 204/237 |
| 2012/0111734 | A1* | 5/2012 | Kramer | C25B 1/06 |
| | | | | 205/412 |
| 2014/0096728 | A1* | 4/2014 | Ortenheim | C25B 9/04 |
| | | | | 123/3 |

FOREIGN PATENT DOCUMENTS

| | | |
|---|---|---|
| CN | 101775612 A | 7/2010 |
| CN | 202157120 U | 3/2012 |
| CN | 203613266 U | 5/2014 |

\* cited by examiner

MODULARIZED HEALTH GAS GENERATOR

PRIORITY CLAIM

This application claims the benefit of the filing date of Chinese Patent Application No. 201310619136.6, filed Nov. 28, 2013, entitled "MODULARIZED HEALTH GAS GENERATOR," and the contents of which are hereby incorporated by reference in their entirety.

FIELD OF THE INVENTION

The present invention relates to a modular health gas generator, more particularly, to the modular health gas generator to freely increase and decrease the quantity of the electrolytic tanks.

BACKGROUND

From the beginning until now, humanity has always made preserving life a high priority. Many developments in medical technology are used for diseases and increasing life expectancy. In the past, most medical treatment was passive. In other words, diseases are treated only when people fall ill, by performing surgical operation, medication, chemotherapy, radiation treatment and so on. But recently, many medical experts are focused on disease prevention, such as studying on the health foods, and screening for inherited diseases to actively reduce the risk of falling ill. Furthermore, in order to increase the life expectancy, many anti-aging technologies have been developed, including skin care products and antioxidant food/medicine and so on. Studies have found that there is an unstable oxygen species (O+), also known as free radicals, in the human body. The free radicals are usually generated due to diseases, diet, environment and one's life style, and the free radicals in human body can be exerted in the form of water by reacting with the inhaling hydrogen. With this method the amount of free radicals in the human body can be reduced, thereby restoring the body condition from an acidic state to an alkaline state, achieving an anti-oxidation, anti-aging, beauty and health effect, and even eliminating chronic diseases. There are also clinical experiments showing that, for patients who inhale a high concentration of oxygen for a long time, the lung damage from the high concentration of oxygen can be ameliorated by the inhaling hydrogen.

Furthermore, the function of hydrogen-oxygen gas cannot only achieve for the health effect, but also for generating an oxy-hydrogen flame to heat or burn and cleaning engine accumulating carbon. The normal hydrogen-oxygen gas is generated from liquid water electrolyzed in an electrolytic tank. However, the process for electrolyzing the liquid water easily generates high working temperature. In order to prevent a hydrogen explosion in the high working temperature, the traditional electrolytic tanks for generating the hydrogen-oxygen gas mostly use the air-cooling type, in other words, using fans for decreasing the temperature. However, if a fault of fans occurred, it would increase the temperature of the electrolytic tank of hydrogen-oxygen gas to cause the hydrogen explosion.

Please refer to FIG. 8. FIG. 8 is a schematic diagram illustrating a traditional hydrogen electrolytic device. The electrolytic device 100 comprises an electrolytic tank 102. The electrolytic tank 102 further comprises electrodes 106A, 106B. The electrodes 106A, 106B are a cathode electrode and an anode electrode respectively and coupled to a power source (not shown in FIG. 8) for supplying an electrical energy to electrolyze the liquid. Electrolytic water 104 in the electrolytic tank 102 will be electrolyzed after the power is applied to electrodes 106A, 106B. And then the cathode (negative electrode) and the anode (positive electrode) will generate the hydrogen and the oxygen respectively and release in the upper portion of the electrolytic tank 102 to form a hydrogen-oxygen mixed gas 108. The hydrogen-oxygen mixed gas 108 is outputted from an output pipeline of the electrolytic tank 102. However the production amount of the hydrogen-oxygen gas in the electrolytic device is generally limited to the shape and structure of the electrolytic tank.

SUMMARY OF THE INVENTION

Therefore, the present invention provides a modular health gas generator having a plurality of freely detachable electrolytic tanks and can control the generation rate of the hydrogen-oxygen gas through thereto.

One of the aspects of the present invention provides a modular health gas generator comprising an inner tank, an electrolytic tank, and a transfusion pipe. The inner tank has a hollow portion, a plurality of gas inlets, and a water outlet. The hollow portion of the inner tank is adapted to accommodate liquid water. The electrolytic module comprises at least one electrolytic tank and a connected tank. The electrolytic tank has a hollow portion, a water inlet, and a gas outlet. The hollow portion of the electrolytic tank is adapted to accommodate liquid water. The gas outlet of the electrolytic tank is corresponding to the gas inlet of the inner tank, and the gas outlet of the electrolytic tank and the gas inlet of the inner tank are connected through a gas pipe. The electrolytic tank is detachable to configure in the electrolytic module. The connected tank comprises a plurality of openings. The water inlet of the electrolytic tank is corresponding to one opening of connected tank. The transfusion pipe is connected to the water outlet of the inner tank and the connected tank, whereby the inner tank can supply the liquid water to the electrolytic tank.

Based on the above descriptions, the electrolytic module may selectively comprise a tank shelf. The tank shelf comprises a plurality of first longitudinal perforations. The electrolytic tank comprises a tank body. The tank body is correspondingly configured within one of the first longitudinal perforations of the tank shelf.

Furthermore, the electrolytic module may selectively further comprises an electrode shelf. The electrode shelf comprises a plurality of second longitudinal perforations. The electrolytic tank comprises an electrode plate. The electrode plate is correspondingly configured to the one of the second longitudinal perforations of the electrode plate. And the under portion of the electrode plate is configured within the hollow portion of the electrolytic tank.

Additionally, the tank shelf may selectively further comprise at least one third lateral perforation and a first cylinder. The tank body of the electrolytic tank comprises at least one first lateral perforation. The third lateral perforation of the tank shelf and the first lateral perforation of the tank body are penetrated through by the first cylinder.

Then, the under portion of the electrode plate may selectively have a second lateral perforation for proving the first cylinder of the tank shelf to penetrate through.

Furthermore, the electrode shelf may selectively comprise at least one fourth lateral perforation and a second cylinder. The upper portion of the electrode plate comprises a second lateral perforation. The fourth lateral perforation of the electrode shelf and the second lateral perforation of the upper portion of the electrode plate are penetrated through by the second cylinder.

Additionally, the electrode shelf may selectively comprise at least one fourth lateral perforation and a second cylinder. The upper portion of the electrode plate is an inverted U-shape and comprises a head portion and a neck portion. The head portion and the neck portion of the upper portion of the electrode plate have a second lateral perforation respectively. The fourth lateral perforation of the electrode shelf and the second lateral perforations of the head portion and the neck portion of the upper portion of the electrode plate are penetrated through by the second cylinder respectively.

Based on the above descriptions, the electrolytic tank of the present invention may selectively comprise a cover body. The cover body has a longitudinal opening for providing the under portion of the electrode of the electrolytic tank to penetrate through.

Then, the tank shelf may selectively comprise a first cylinder. The tank body is penetrated through by the first cylinder. The electrode shelf comprises a second cylinder. The upper portion of the electrode plate is penetrated through by the second cylinder. Wherein the first cylinder of the tank shelf may selectively be connected to a conductive element, the second cylinder of the electrode shelf is connected to another conductive element. Whereby the electrode plate of the electrolytic tank is an anode; and the tank body of the electrolytic tank is a cathode. At the same time, the under portion of the electrode plate may selectively have a second lateral perforation and an isolated piece. The second lateral perforation of the under portion of the electrode plate is used for providing the first cylinder of the tank shelf to penetrate through, and the isolated piece can prevent the first cylinder of the tank shelf from conducting the electrode plate.

Then, as the said upper portion of the electrode plate may selectively be an inverted U-shape and comprise a head portion and a neck portion. The head portion and the neck portion of the upper portion of the electrode plate have a second lateral perforation respectively. The second lateral perforations of the head portion and the neck portion of the upper portion of the electrode plate are penetrated through by the second cylinder. At the same time, the electrode shelf may selectively comprise a plurality of second longitudinal perforations, wherein the head portion of the upper portion of the electrode plate and the neck portion of the upper portion of another neighboring electrode plate are correspondingly configured within one of the second longitudinal perforation of the electrode shelf, and the under portion of the electrode plate is configured within the tank body of the electrolytic tank.

Then, another aspect of the present invention provides a modular health gas generator comprising an inner tank and a plurality of electrolytic tanks. The inner tank has a hollow portion, and a plurality of gas inlets, a gas outlet, and a water outlet. The hollow portion of the inner tank is adapted to accommodate the liquid water. The plurality of gas inlets, the gas outlet, and the water outlet are connected to the hollow portion of the inner tank respectively. Each electrolytic tank has a hollow portion, a water inlet, and a gas outlet respectively. The hollow portion of the electrolytic tank is used for accommodating liquid water. The water inlet and the gas outlet of the electrolytic tank are correspondingly connected to the hollow portion of the electrolytic tank respectively. The water inlet and the gas outlet of the plurality of electrolytic tanks are connected to the water outlet and the plurality of gas inlets of the inner tank respectively. The plurality of electrolytic tanks can be independently disassembled from the inner tank. In the application, the plurality of hollow portions of the plurality of electrolytic tanks are inputted the liquid water from the inner tank. The liquid water is electrolyzed in the plurality of electrolytic tanks to generate the hydrogen-oxygen gas and input to the inner tank and then output through the gas outlet.

Then, the inner tank may selectively and further comprise a depressurizing device. The depressurizing device is configured on the surface of the inner tank and connected to the hollow portion. When the inner pressure of the hollow portion exceeds a preset pressure, the depressurizing device will be automatically opened for depressurizing the pressure, wherein the water inlet of the plurality of electrolytic tanks may selectively be configured to the bottom of the plurality of electrolytic tanks.

Additionally, the present invention may selectively have a transfusion pipe. The transfusion pipe is simultaneously connected to the water outlet and the plurality of water inlets to input the liquid water in the inner tank to the plurality of electrolytic tanks.

In conclusion, one focus of the present invention is to provide a modular health gas generator having the automatically filling water and cooling functions, then the generation rate of the hydrogen-oxygen gas may be controlled through the plurality of freely detachable electrolytic tanks.

DETAILED DESCRIPTION

In order for the advantages, spirits and characteristics of the present invention to be more clearly and easily understood, the embodiments and appended drawings thereof are discussed in the following. It should be noted that, these embodiments are only the representational embodiment of the present invention, wherein the embodiment or corresponding embodiment of the present invention is not limited by the specific method, device, condition, material and so on exampled in the present invention.

Figure 1:
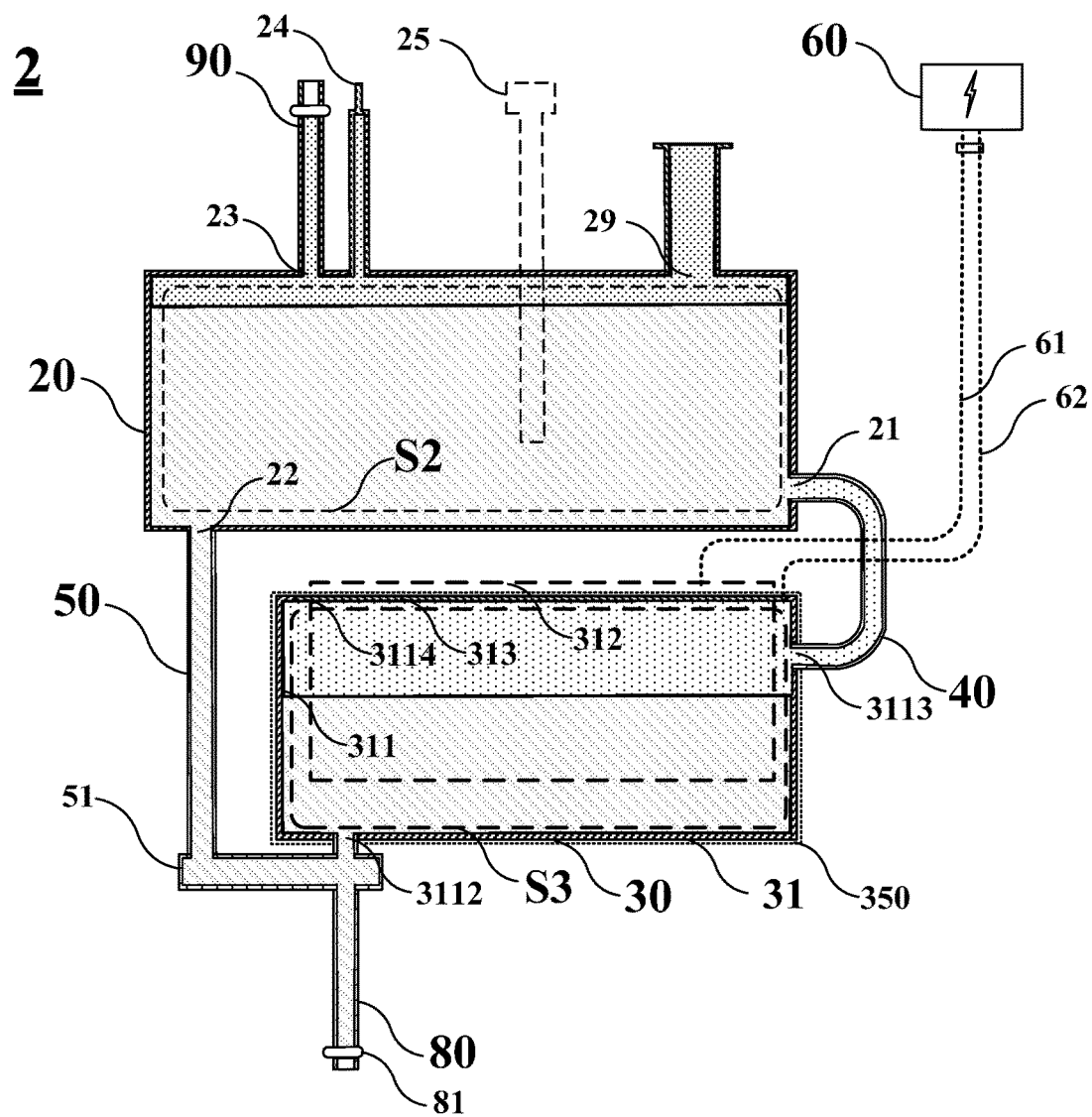
FIG. 1 is a side schematic diagram illustrating the first module in the modular health gas generator according to one preferred embodiment of the present invention.
Figure 2A:
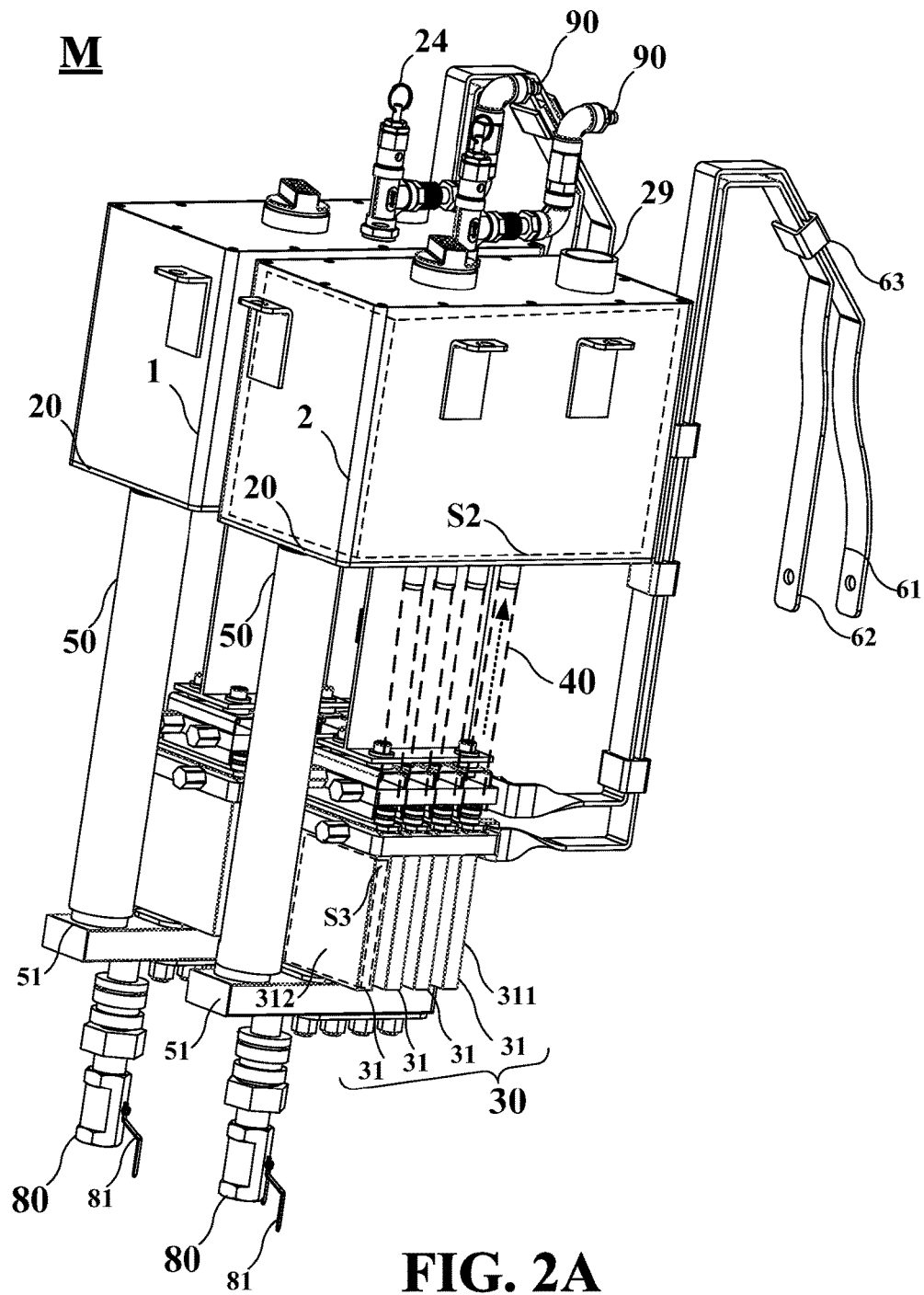
FIG. 2A and FIG. 2B are stereoscopic schematic diagrams illustrating the modular health gas generator in different visual angles according to one preferred embodiment of the present invention.
Figure 2B:
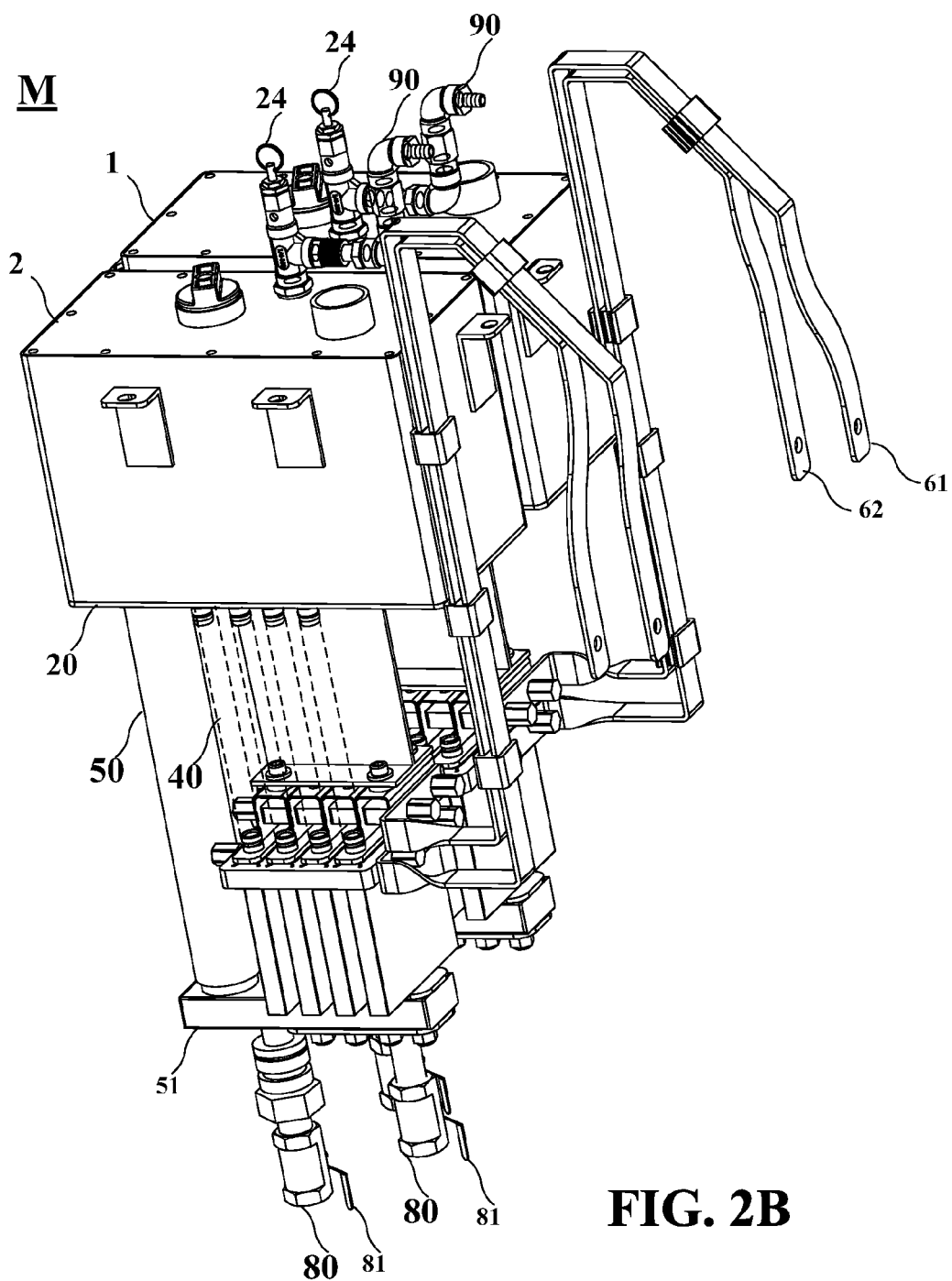
Figure 3A:
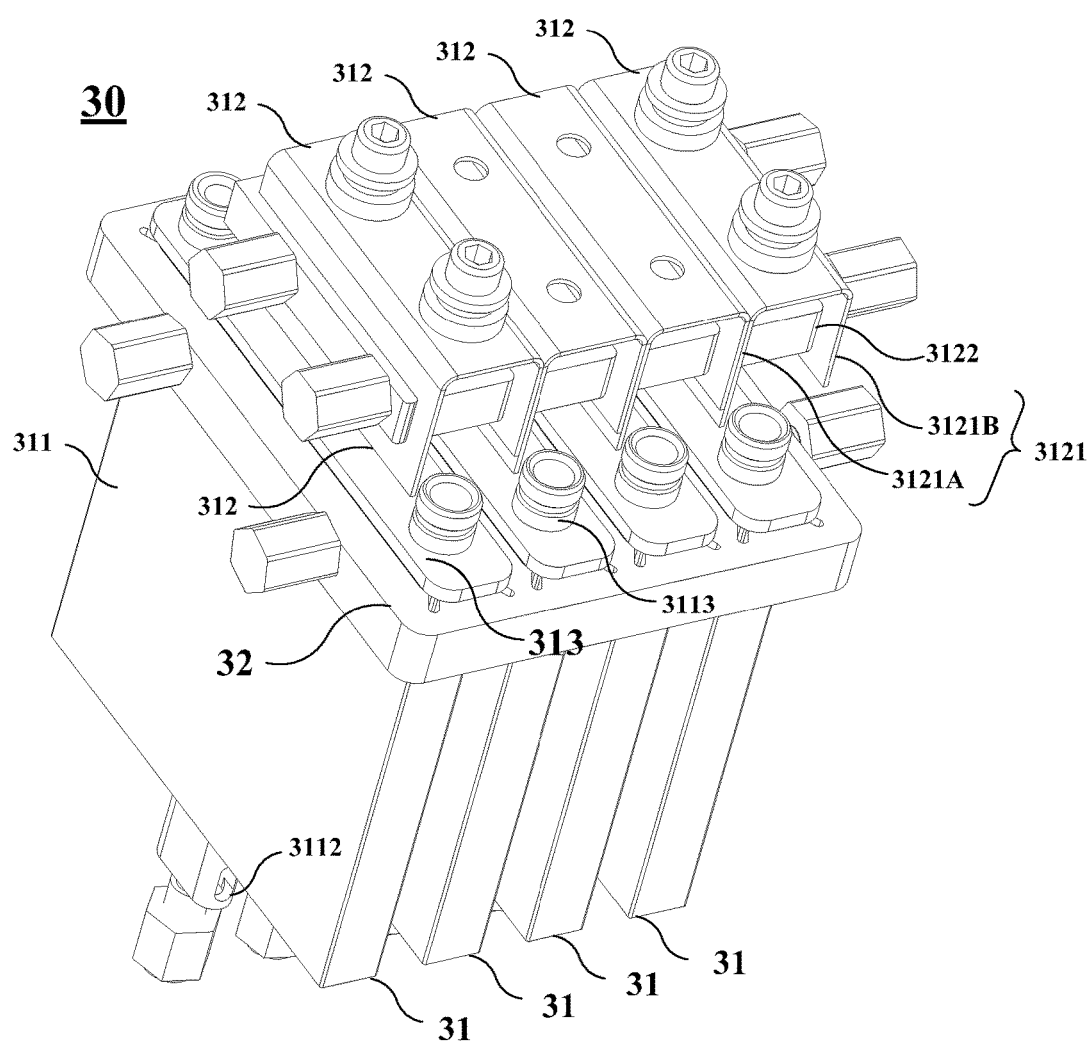
FIG. 3A to FIG. 3E are a stereoscopic schematic diagram, a bottom view, a sectional view taken along line B-B of the bottom view, a top view, and a sectional view taken along line D-D of the top view illustrating the electrolytic module in the second module according to one preferred embodiment of the present invention.
Figure 3B:
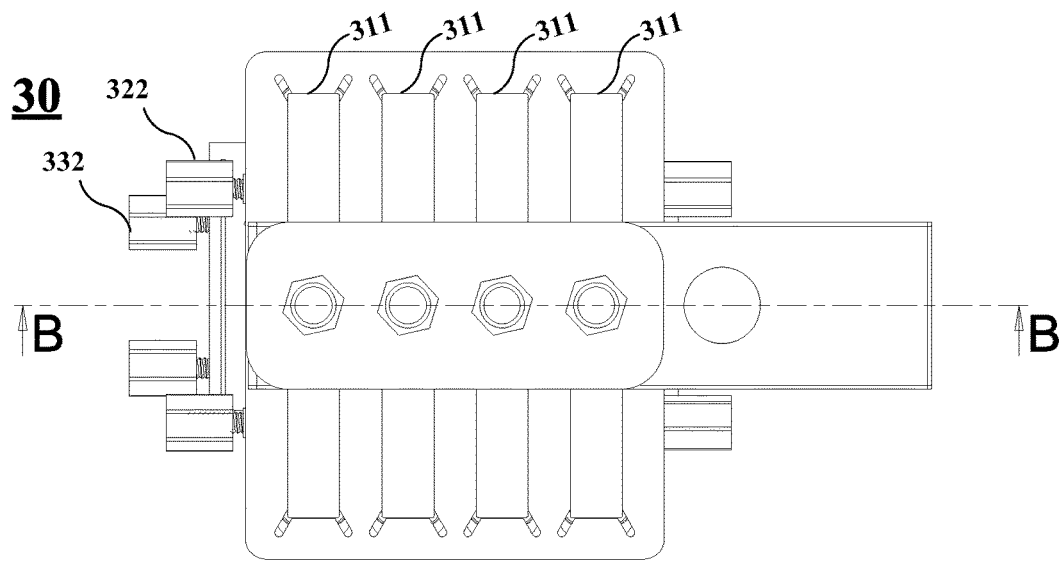
Figure 3C:
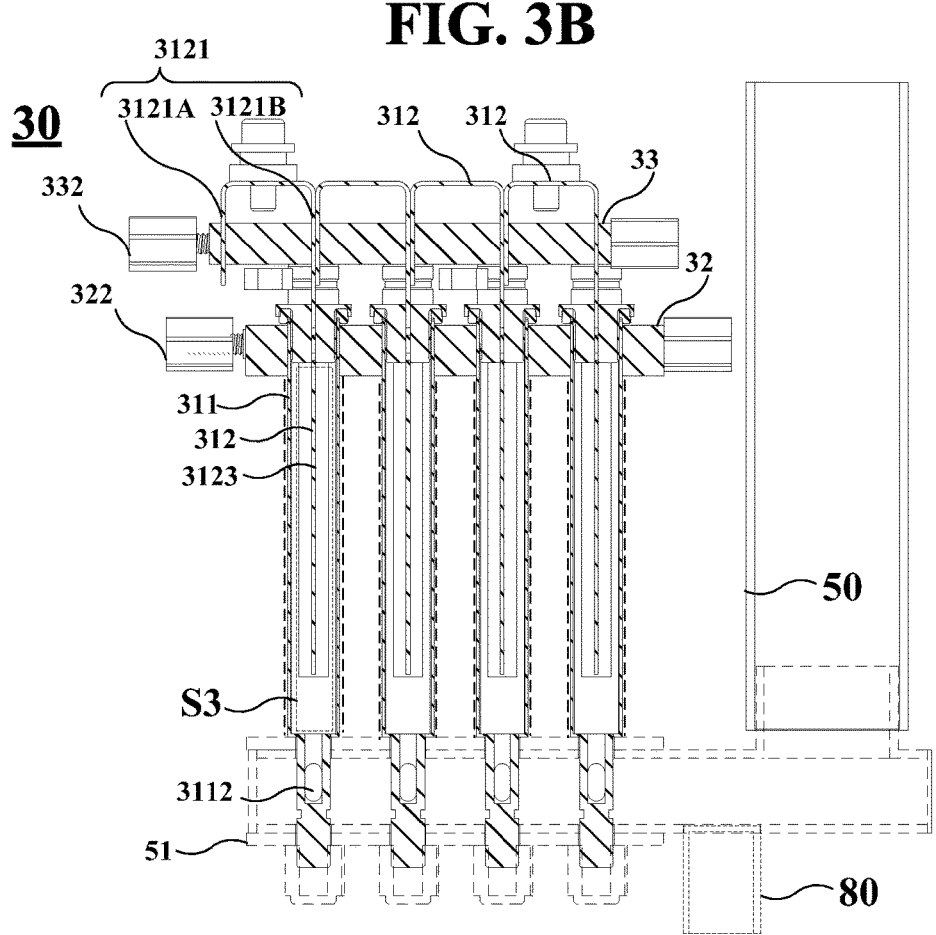
Figure 3D:
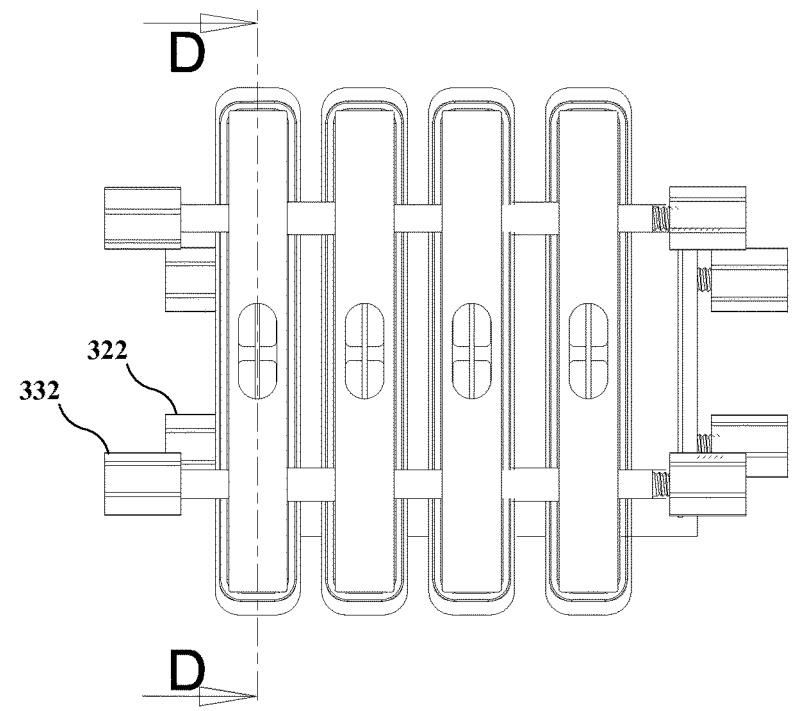
Figure 3E:
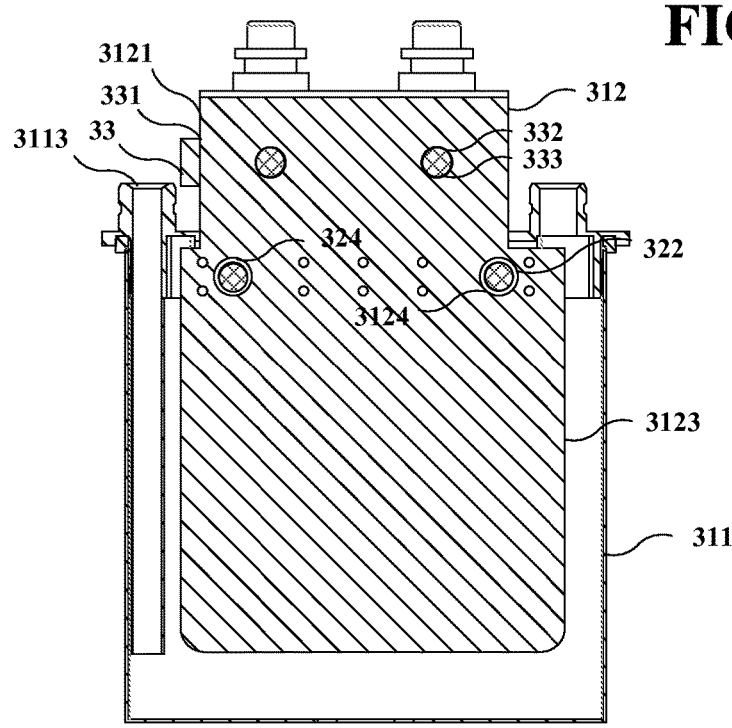

Please refer to FIG. 1, FIG. 2A, and FIG. 2B. FIG. 1 is a side schematic diagram illustrating the first module in the modular health gas generator according to one preferred embodiment of the present invention. FIG. 2A and FIG. 2B are stereoscopic schematic diagrams illustrating the modular health gas generator (hereinafter referred to as the system or the present invention) in different visual angles according to one preferred embodiment of the present invention. It should be noted that, FIG. 1 is used for illustrating the corresponding relationship and the operating principle between each devices, and its design has been appropriately adjusted.

As shown in the figures, in the present embodiment, the major component of the modular health gas generator M approximately comprises two modules, namely a first module 1 and a second module 2. The design of the first module 1 and second module 2 are basically similar or the same, therefore the following descriptions will be explained for the design of the second module 2. In the application, the said each module can be freely and independently used. When the user needs more gas, the invention can be freely added another module according to the need for gas production. Besides, the present invention may also comprise a third module or a fourth module and so on with the same as the said second module, the present invention does not limit to this.

Please refer FIG. 1, FIG. 2A, and FIG. 2B. The second module 2 of the present invention comprises an inner tank 20 and an electrolytic module 30. The inner tank 20 is used for accommodating liquid water for supplying the liquid water to the electrolytic module 30. Each electrolytic tank 31 in the electrolytic module 30 is used for electrolyzing the liquid water to generate a hydrogen-oxygen gas. As shown in FIG. 1, a water outlet 22 of the inner tank 20 is connected to a water inlet 3112 of each electrolytic tank 31 in the electrolytic module 30 through a transfusion pipe 50 and a connected tank 51. Therefore, the inner tank 20 can supply the liquid water to the electrolytic tank 31 through the transfusion pipe 50 and the connected tank 51 when the liquid water in the electrolytic tank 31 is consumed by the electrolytic action. Of course, in another embodiment, each electrolytic tank 31 can be connected to the inner tank 20 respectively through the independent transfusion pipe without the connected tank to make the inner tank 20 supply the liquid water to the electrolytic tank 31.

The liquid water in the inner tank 20, in one aspect, can supply the liquid water to the electrolytic tank 31; in another aspect, the liquid water can decrease the temperature of the hydrogen-oxygen gas generated from the electrolytic tank 31. When the hydrogen-oxygen gas is generated from the liquid water electrolyzed in the electrolytic tank 31, the hydrogen-oxygen gas from a gas outlet 3113 is inputted to a gas inlet 21 by a gas pipe 40 of the inner tank 20 and electrolytic tank 31 to enter into a hollow portion S2 of the inner tank 20, and then the hydrogen-oxygen gas can be outputted by a gas-out pipe 90 of the inner tank 20 for application. When the hydrogen-oxygen gas generated by the electrolytic tank 31 is inputted to the inner tank 20, the most of the hydrogen-oxygen gas will float to the surface of the liquid water, the upper portion of the inner tank 20. However, in the process of floating the hydrogen-oxygen gas from the bottom of the liquid water to the surface of the liquid water, the liquid water in the inner tank 20 can absorb the heat and then reduce the temperature of the hydrogen-oxygen gas, whereby the invention can reduce the probability of the hydrogen explosion generated by the hydrogen-oxygen gas to improve the security of the system. Of course, in another embodiment, each electrolytic tank 31 can firstly connect to a gas-input connected tank (not shown in the figure) and then connect to a gas inlet of the inner tank 20 through the gas-input connected tank to make the hydrogen-oxygen gas generated by each electrolytic tank be input to the inner tank 20.

The better configuration of the inner tank 20 is higher than the electrolytic tank 31, as shown in FIG. 2A and FIG. 2B, the bottom portion of the inner tank 20 is higher than the top portion of the electrolytic tank 31, or the bottom portion of the inner tank 20 is higher than the bottom portion of the electrolytic tank 31. Now the inner tank 20 does not need other pressurized devices, the inner tank 20 can automatically supply water to the electrolytic tank 31. Furthermore, the hydrogen-oxygen gas inputted in the inner tank 20 will generate a pressure in the surface of the liquid water of inner tank 20. The pressure will promote the inner tank 20 to automatically supply water to the electrolytic tank 31.

The following will describe and explain the design of the inner tank 20 and the electrolytic module 30. Please refer to FIG. 1, FIG. 2A, and FIG. 2B, the inner tank 20 has the gas inlet 21, a gas outlet 23, a water inlet 29, and a water outlet 22. The gas inlet 21 and gas outlet 23 are used to input and output the hydrogen-oxygen gas to the inner tank respectively. The water inlet 29 and the water outlet 22 are used to input and output the liquid water to the inner tank respectively. Furthermore, the inner tank 20 of the present invention may be further configured a depressurizing device 24. When a pressure in the inner tank 20 stored the hydrogen-oxygen gas exceeds the preset pressure, the pressure can be depressurized through the depressurizing device 24 to prevent hydrogen explosion. For example, when the gas outlet 23 for discharging is abnormal, such as blockage and so on, the hydrogen-oxygen gas will be continuously generated from the electrolytic tank 31, and the gas production and pressure of the hydrogen-oxygen gas in the inner tank 20 will increase, and then the pressure will be depressurized through the depressurizing device 24. In one embodiment, the pressure will be depressurized when the preset pressure is at 1 atmosphere, and the depressurizing device 24 may be a solenoid valve.

Furthermore, the inner tank 20 may selectively comprise a water level monitor 25, shown in dotted lines. The water level monitor 25 is used for detecting the water level of the liquid water in the inner tank 20. The water level monitor 25 may be a simple control circuit or a computer system. When the water level of the liquid water in the inner tank 20 detected by the water level monitor 25 is smaller than a preset value, the water level monitor 25 may control a valve configured at the water inlet 29 of the top portion of the inner tank 20 to supply the liquid water, or using an alarm device informs the user to supply the liquid water through the water inlet 29. The alarm device may be any one of a whistle, an alarming bell, an alarming light, or an alarm message of the computer system. In addition to the low level of security, the water level monitor 25 may also be used for detecting the high level of security of the liquid water in the inner tank 20. When the water supplied by the user makes the water level be higher than a preset value of the high water level, the water level monitor 25 immediately illuminates the warning light for informing the user to stop supplying water.

Then, in order to easily clean and maintain, the inner tank 20 may be connected to a drain pipe 80. The drain pipe 80 is connected to the hollow portion S2 of the inner tank 20 through the transfusion pipe 50 and the connected tank 51 for automatically discharging the liquid water out. The drain pipe 80 is further configured a valve 81, the valve 81 may be a solenoid valve or a hand valve. The valve 81 may be controlled by the user to open or close the drain pipe 80. As an aside, the drain pipe 80 is not only connected to the inner tank 20, but also connected to the hollow portion S3 of each electrolytic tank 31 in the electrolytic module 30 through the connected tank 51 for discharging the liquid water in each electrolytic tank 31 out.

In another aspect, please refer to FIG. 3A to FIG. 3E. FIG. 3A to FIG. 3E are a stereoscopic schematic diagram, a bottom view, a sectional view taken along line B-B of the bottom view, a top view, and a sectional view taken along line D-D of the top view illustrating the electrolytic module in the second module according to one preferred embodiment of the present invention.

As shown in the figures, the electrolytic module 30 comprises a plurality of electrolytic tanks 31, tank shelves 32, electrode shelves 33, and connected tanks 51. In the present embodiment, each electrolytic tank 31 is an electrolytic tank with the flat shape and composed of a tank body 311, an electrode plate 312, and a cover body 313.

The tank body 311 has a longitudinal opening 3114, at least two coaxial first lateral perforation 3111, and the said hollow portion S3. The hollow portion S3 is adapted to accommodate the liquid water. The electrode plate 312 has an upper portion 3121 and an under portion 3123, wherein the upper portion 3121 and the under portion 3123 have a plurality of second lateral perforations 3122, 3124.

After the electrolytic tank 31 is combined, the cover body 313 is penetrated through by the under portion 3123 of the electrode plate 312 via the longitudinal opening 3114 of the tank body 311 to the hollow portion S3. At the same time, the second lateral perforation 3124 of the under portion 3123 of the electrode plate 312 and the plurality of first lateral perforations 3111 of the tank body 311 are configured coaxially. And the upper portion 3121 of the electrode plate 312 is configured on the external part of the tank body 311. In order to make the electrode plate 312 and the tank body 311 are insulated from each other, the cover body 313 may be made by an insulating material.

As shown in FIG. 5, the tank shelf 32 has a plurality of first longitudinal perforations 321, a plurality of third lateral perforations 323, and laterally configured first cylinders 322. Each first longitudinal perforation 321 is provided for embedding the tank body 311 of each electrolytic tank 31 on the first longitudinal perforation 321 to maintain the relative position of each electrolytic tank 31. At the same time, the tank shelf 32 also has the plurality of third lateral perforations 323. The plurality of third lateral perforations 323 of the tank shelf 32 is corresponding to the plurality of first lateral perforations 3111 of each tank body 311, and both of them are configured coaxially. In an assembly condition, the tank shelf 32, the tank body 311, and each coaxially configured third lateral perforation 323, first lateral perforation 3111, and second lateral perforation 3124 of the tank shelf 32, the tank body 311, and the electrode plate 312 are laterally penetrated through by the first cylinder 322 of the tank shelf 32. And the first cylinder 322 of the tank shelf 32 is coupled to the tank body 311. And in the present embodiment, the first cylinders 322 of the tank shelf 32 can be electrically connected to the conductive element 62, whereby the electricity is conducted from the conductive element 62 to the tank body 311 through the tank shelf 32. Of course, in another embodiment, the conductive element 62 may also be directly electrically connected through the first cylinders 322 and tank body 311 for electrically conducting. It can be seen that the plurality of tank bodies 311 are electrically connected to the conductive element 62.

Figure 5A:
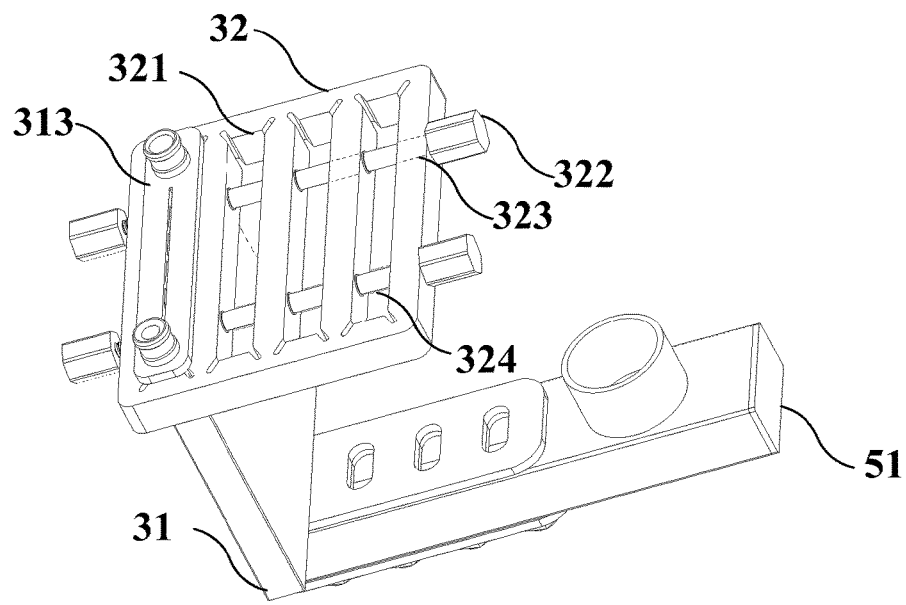
FIG. 5A is a stereoscopic schematic diagram illustrating one embodiment with the electrolytic tank, the tank shelf, and the connected tank shown in FIG. 4.
Figure 5B:
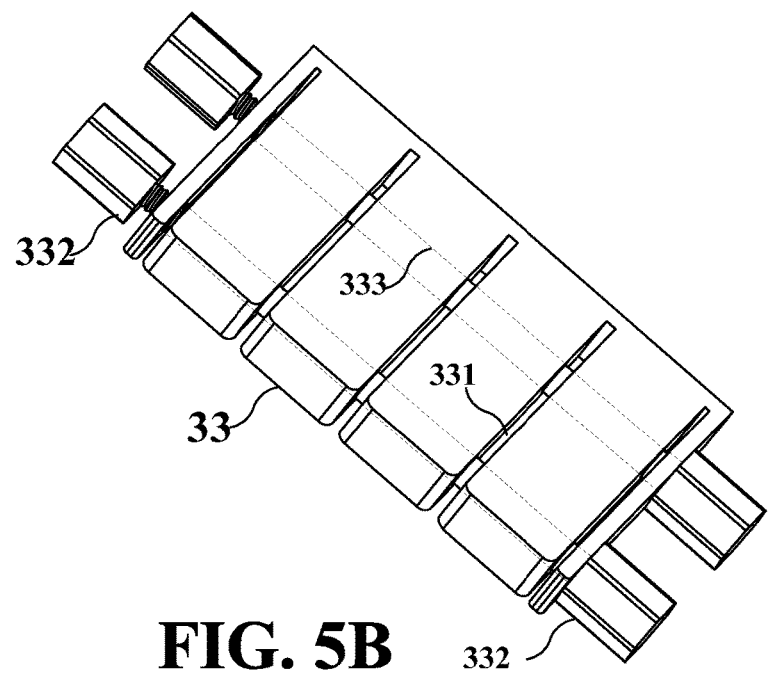
FIG. 5B is a stereoscopic schematic diagram illustrating one embodiment with the electrode shelf shown in FIG. 4.

In another aspect, as shown in the FIG. 5B, the under portion 3123 of the electrode plate 312 is configured in the electrode shelf 33. The electrode shelf 33 has a plurality of second longitudinal perforations 331, a plurality of fourth lateral perforations 333, and laterally configured second cylinder 332. Each second longitudinal perforation 331 is provided for embedding the upper portion 3121 of each electrode plate 312 in the first longitudinal perforation 321 to maintain the relative position of each electrode plate 312. The fourth lateral perforation 333 of the electrode shelf 33 and the corresponding second lateral perforation 3122 of the upper portion 3121 of the electrode plate 312 are configured coaxially. In a finishing assembly condition, the fourth lateral perforation 333 and the second lateral perforation 3124 of the electrode shelf 33 and the electrode plate 312 are laterally penetrated through by the second cylinder 332 of the electrode shelf 33. And the second cylinder 332 of the electrode shelf 33 is coupled to the electrode plate 312. And in the present embodiment, the second cylinder 332 of the electrode shelf 33 can be electrically connected to the conductive element 61, whereby the electricity is conducted from the conductive element 61 to the electrode plate 312 through the electrode shelf 33. Of course, in another embodiment, the conductive element 61 may also be directly electrically connected through the second cylinder 332 and electrode plate 312 for electrically conducting. It can be seen that the plurality of electrode plates 312 are electrically connected to the conductive element 61. As an aside, the first cylinders 322 and the second cylinder 332 may be a copper rod or be made by other high-conductivity materials, and the tank shelf 32 or the electrode shelf 33 may be made by a copper or other high-conductivity materials.

Figure 7A:
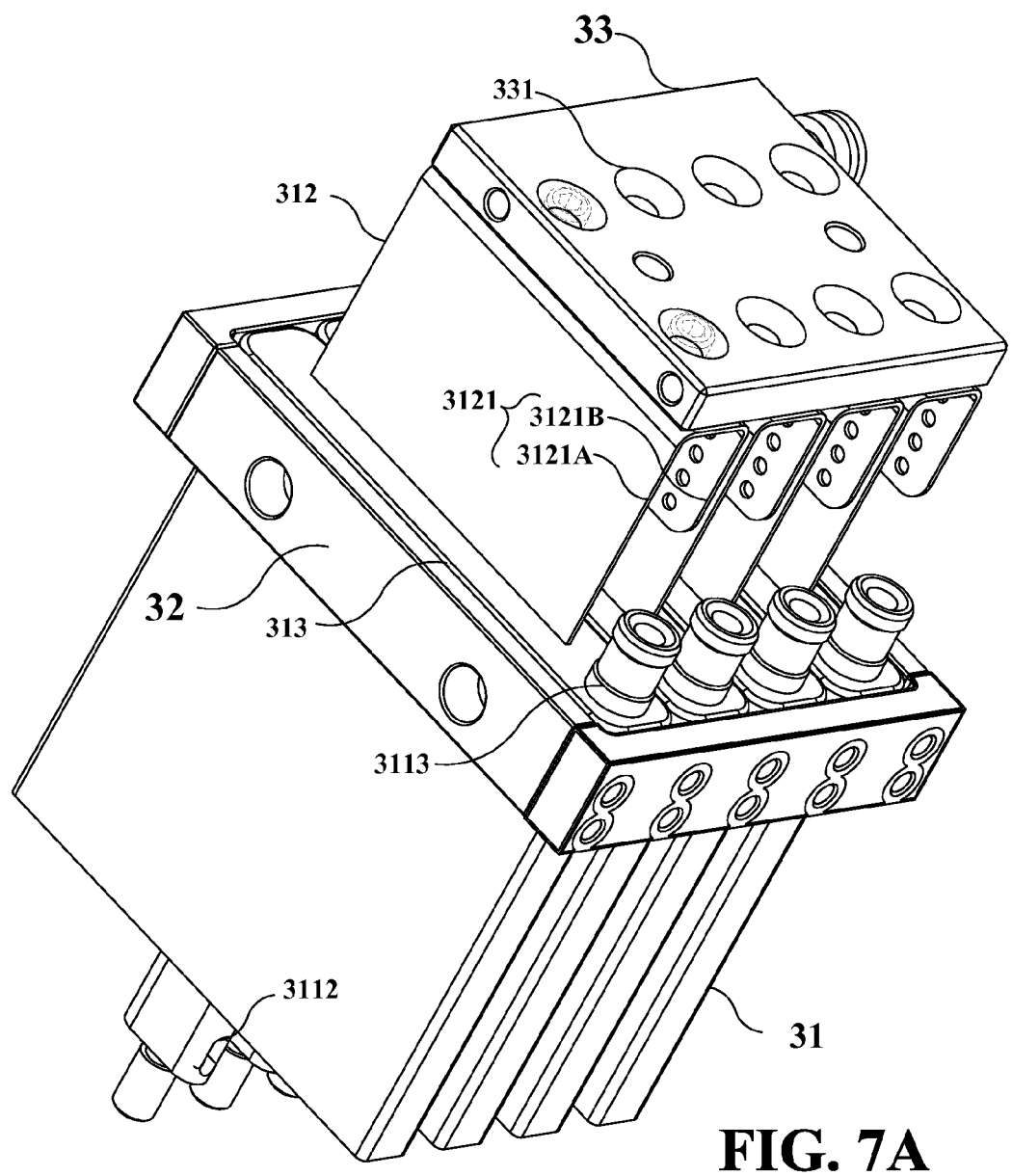
FIG. 7A to FIG. 7C is a stereoscopic schematic diagram, a top view, and a sectional view taken along line A-A of the top view illustrating another embodiment with the electrolytic module.
Figure 7B:
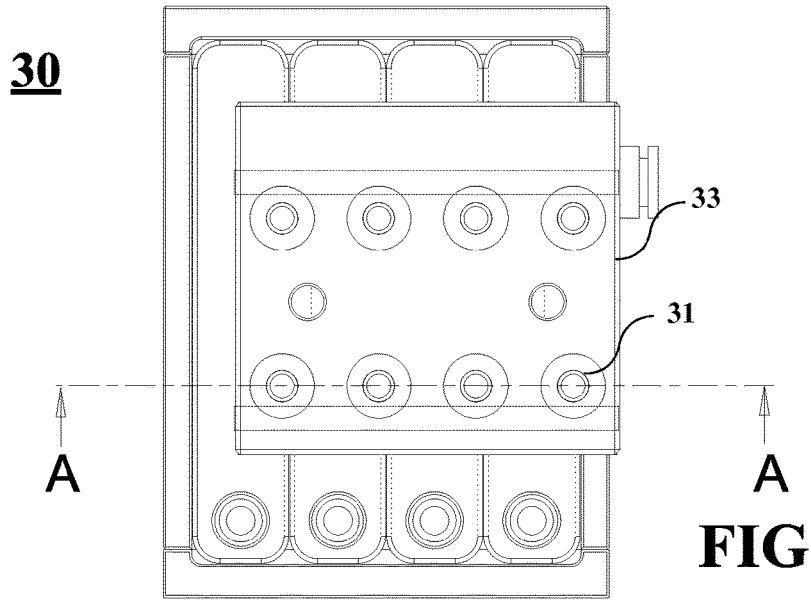
Figure 7C:
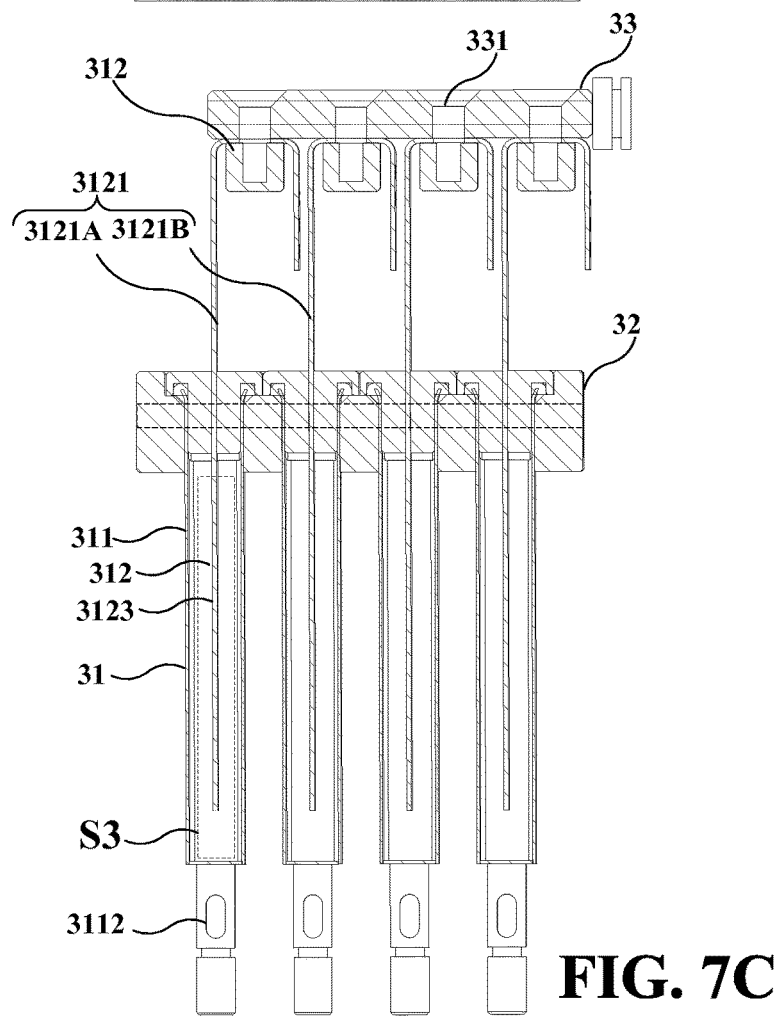
Figure 8:
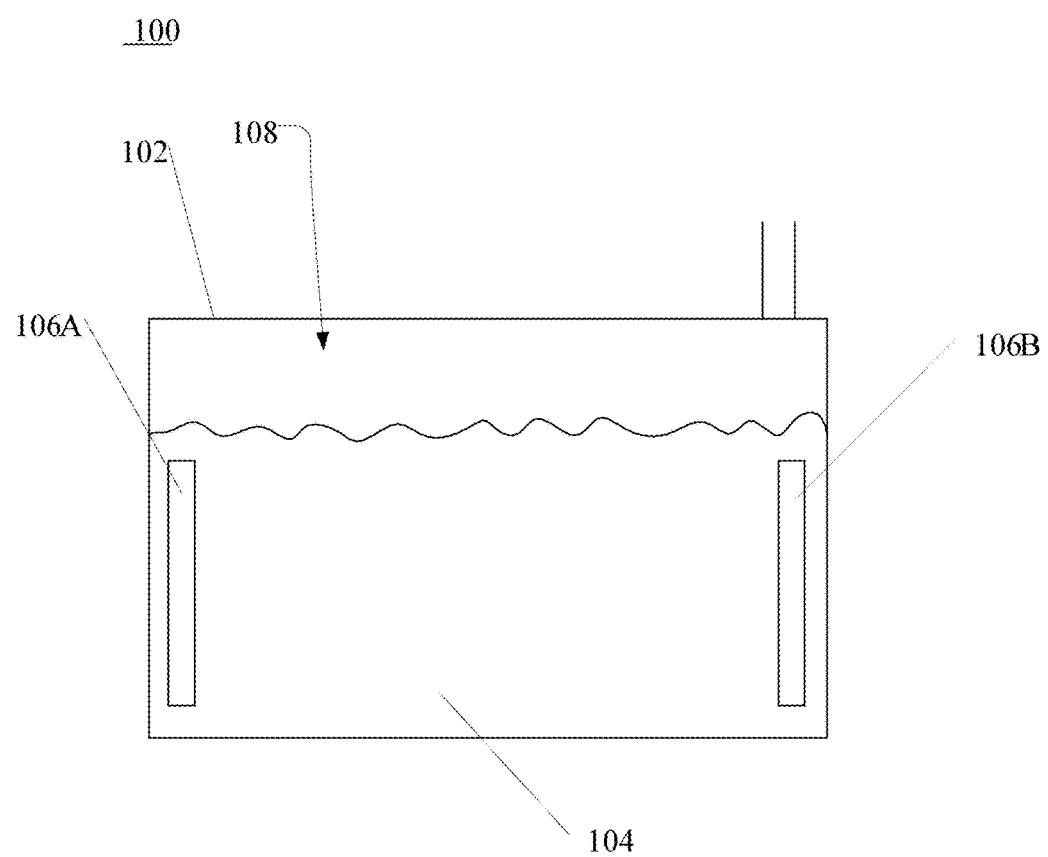
FIG. 8 is a schematic diagram illustrating a traditional hydrogen electrolytic device.

At the same time, in the present embodiment, the upper portion 3121 of the electrode plate 312 may be divided into a head portion 3121A and a neck portion 3121B. Furthermore, the upper portion 3121 of the electrode plate 312 is approximately an inverted U-shape. And the head portion 3121A of the electrode plate 312 may be connected to the neck portion 3121B of the neighboring electrode plate to be configured in the second longitudinal perforation 331 of the same electrode shelf 33. And thus each electrode plate 312 may be closely configured to each other for getting the better conducting performance. In the application, at least one longitudinal perforations (not marked in the figure) may be provided for screws to penetrate through and fix on another fixed plate (not marked in the figure) between the head portion 3121A and the neck portion 3121B of the upper portion 3121 of the electrode plate 312, and thus the plurality of electrode plates 312 can be further locked and fixed. Of course, in another embodiment, the upper portion 3121 of the electrode plate 312 can only has the head portion 3121A without the neck portion 3121B. The head portion 3121A of the electrode plate 312 is configured in the second longitudinal perforations 331 of the electrode shelf 33. Furthermore, the above example is that the electrode shelf 33 is penetrated through by the upper portion 3121 of the electrode plate 312, and the head portion 3121A and the neck portion 3121B are configured to different design of the longitudinal perforations. Compared to the above example, as shown in the designs illustrated in the FIG. 7A to FIG. 7C, the upper portion 3121 of the electrode plate 312 may not penetrate through the electrode shelf 33 to make the entire electrode plate 312 be maintained at the same end of the electrode shelf 33. The relative position of the electrode shelf 33 and electrode plate 312 is fixed through using the second longitudinal perforation 331 penetrated through by the electrode shelf 33 and a connecting piece, such as screw (not shown in the figure). And in the present embodiment, a gap without the electrical connection is provided between each electrode plate 312.

Then, the electrode shelf 33 has a plurality of lateral configured cylinders (not shown in the figure). In an assembly condition, the electrode shelf 33 is laterally penetrated through and coupled to the cylinder (not shown in the figure) of the electrode shelf 33. The cylinder of the electrode shelf 33 can be electrically connected to the conductive element 61, whereby the electricity is conducted from the conductive element 61 to the electrode plate 312 through the electrode shelf 33.

In another embodiment, the fixed way of the tank body 311 or the electrode plate 312 cannot need the first cylinder 322 or the second cylinder 332, the tank body 311 or the electrode plate 312 only needs the tank shelf 32 or the electrode shelf 33 for fixing, and the tank shelf 32 and the electrode shelf 33 will be electrically connected to the conductive element 61, 62 through thereof. Furthermore, the structure or the shape of the tank shelf 32 or the electrode shelf 33 is not limited to the above structure, as it can make the tank body 311 or the electrode plate 312 stable.

As mentioned above, in order to supply the electrical power to the electrolytic tank 31, the tank shelf 32 or the first cylinder 322 of the tank shelf 32 can be electrically connected to the tank body 311 of the electrolytic tank 31, and the electrode shelf 33 or the second cylinder 332 of the electrode shelf 33 can be electrically connected to the electrode plate 312 of the electrolytic tank 31. Furthermore, the first cylinder 322 of the tank shelf 32 and the second cylinder 332 of the electrode shelf 33 are electrically connected to the conductive elements 61, 62 respectively. Therefore, the electrical power needed for electrolyzing water by the electrolytic tank 31 can be supplied through the power source 60 connected to the conductive elements 61, 62. In the present embodiment, the tank body 311 of the electrolytic tank 31 can be a cathode, and the electrode plate 312 of the electrolytic tank 31 can be an anode, but not limited thereto. In practical application, the electric properties of the tank body 311 and electrode plate 312 may also be adjusted respectively by the user according to their need. In order to prevent the short circuit, an isolation pad 63 is configured between the conductive elements 61, 62 for isolating each other. At the same time, in order to prevent the first cylinder 322 of the tank shelf 32 from connecting to the electrode plate 312, please refer to FIG. 3E, an isolated piece 324 is configured between the electrode plate 312 and the first cylinder 322 of the tank shelf 32 for further insulating. In another embodiment, the tank body 311 of the electrolytic tank 31 is not deemed as the electrode. Each electrolytic tank can comprise two electrode plates, and the cover body 313 is penetrated through the two electrode plates. One of the two electrode plates is served as an anode, and the other one of the two electrode plates is served as a cathode. In order to make the two electrode plates be insulated from each other, the cover body 313 may be made by insulation materials. When the plurality of electrolytic tanks 31 are electrically connected in parallel, all of the anode electrode plates in parallel electrolytic tanks 31 are electrically connected to each other; and all of the cathode electrode plates are electrically connected to each other. The above electrical connection can be achieved through the electrode shelf or cylinder, and only note that the anode and the cathode are isolated from each other.

Therefore, the electrical connection way of the plurality of electrolytic tank 31 forms parallel connection. Namely the tank body 311 in all of the electrolytic tanks 31, deemed as the cathode, or the said another electrode be deemed as cathode, is electrically connected to conductive element 62; and the electrode plate 312 in all of the electrolytic tanks 31, deemed as the anode, is electrically connected to the conductive device 61. In another one embodiment, when an electrolytic module 30 has four electrolytic tanks 31 connected to each other in parallel, the output voltage and current of the power source 60 are respectively about 5 volt and 200 amp, namely the power of each electrolytic tank 31 is about 250 watt. Therefore, each electrolytic tank can electrolyze the liquid water to generate a hydrogen-oxygen gas at low voltage. And through a way of connecting the electrolytic tanks in parallel can make the total gas production increase.

Of course, in other embodiments, the operating voltage of each electrolytic tank can be between 24 volt and 4 volt, for example 12 volt to 4 volt, and the operating current of each electrolytic tank can be between 40 amp and 100 amp. The structure for connecting to electrolytic tanks in parallel is not limited to the tank shelf 32 and the electrode shelf 33, for example the conductive device 62 (also called as a second conductive element) and conductive device 61 (also called as a first conductive element) are firstly connected to a control module, not shown in the figure, and then the plurality of electrolytic tanks are connected to the control module. In application, the control module can selectively control the entire or the part of electrolytic tanks 31 to electrolyze the water through the way of connecting to each other in parallel. And then the control module can further selectively control the gas production of the hydrogen-oxygen gas.

In practical application, the surface of the tank body 311 can be selectively and previously coated with an insulating material 350. And thus the number of electrolytic tanks 31 comprised by the electrolytic module 30 in the present invention may be freely adjusted through the detachable design of the tank shelf 32 and the electrode shelf 33.

Figure 4:
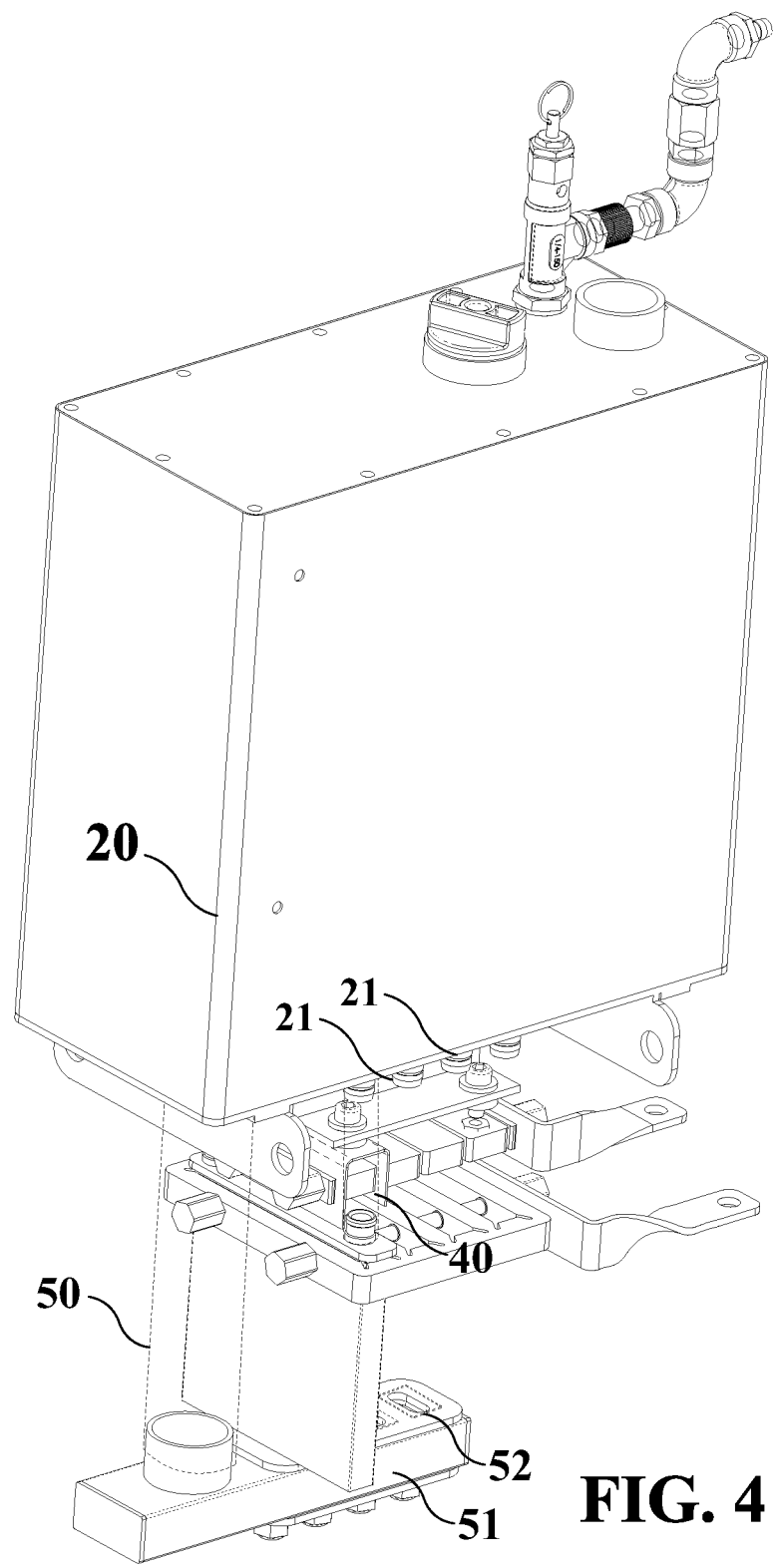
FIG. 4 is a stereoscopic schematic diagram illustrating the present invention according to another preferred embodiment.
Figure 6:
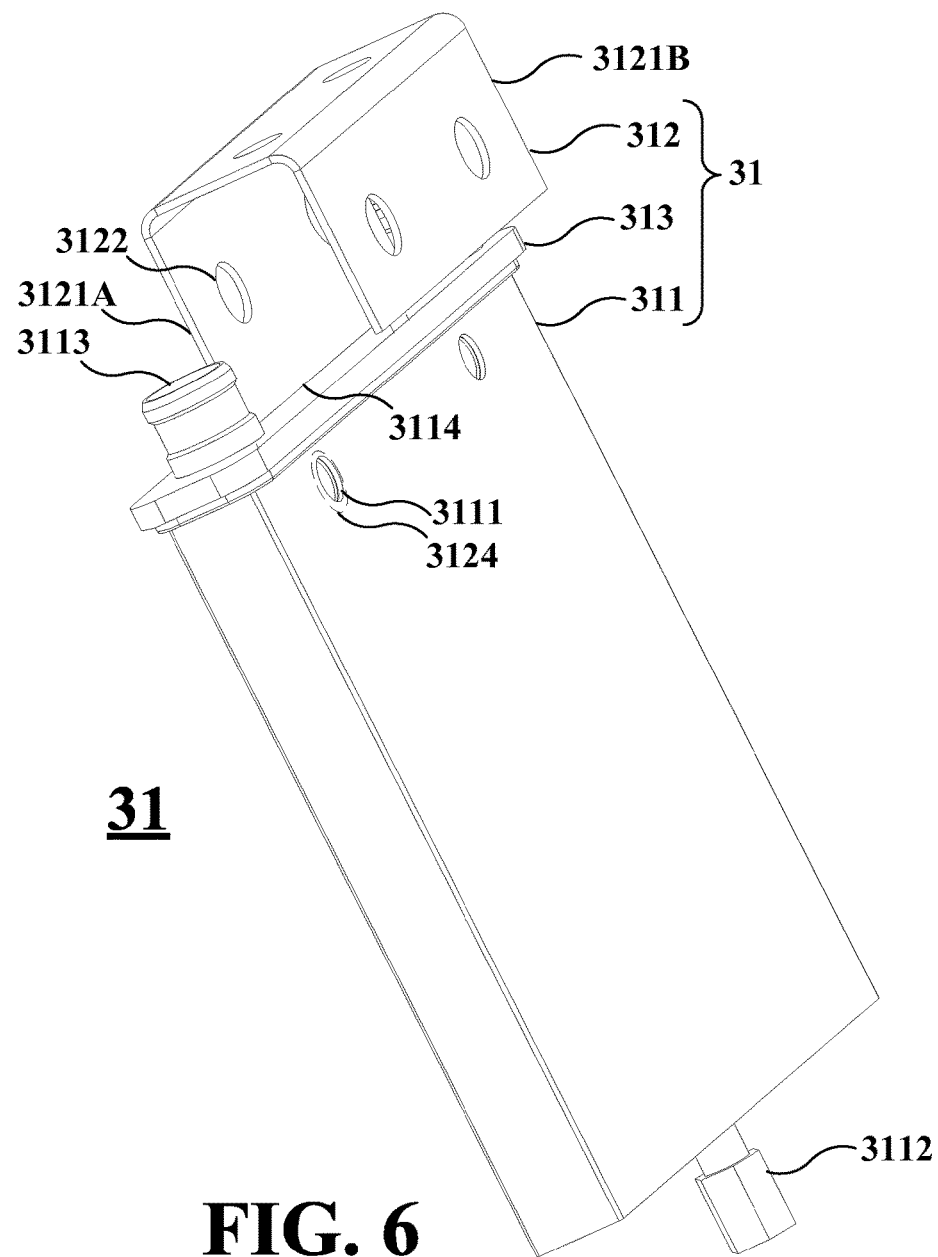
FIG. 6 is a stereoscopic schematic diagram illustrating one embodiment with the electrolytic tank shown in FIG. 4.

In the above embodiment, the electrolytic module 30 in the second module 2 of the present invention comprises four electrolytic tanks 31, but it is not limited thereto, when a required gas amount by the user is not high, the electrolytic module 30 of the present invention may only comprise single electrolytic tank 31, as shown in the FIG. 4, the illustration is one example. Please refer to FIG. 4. FIG. 4 is a stereoscopic schematic diagram illustrating the present invention according to another preferred embodiment. Please refer to FIG. 5A, FIG. 5B, and FIG. 6, FIG. 5A is a stereoscopic schematic diagram illustrating the embodiment with the electrolytic tank, the tank shelf, and the connected tank shown in FIG. 4. FIG. 5B is a stereoscopic schematic diagram illustrating the embodiment with the electrode shelf shown in FIG. 4. FIG. 6 is a stereoscopic schematic diagram illustrating the embodiment with the electrolytic tank shown in FIG. 4. As shown in the figures, the electrolytic module 30 only comprises an electrolytic tank 31. Due to the connected tank 51 has not been occupied, it will have the number of openings, and each opening is corresponding to the water inlet 3112 of the electrolytic tank 31. When part of the openings are not connected to the water inlet 3112 of the electrolytic tank 31, the unused openings may be sealed through using a plurality of water outlet sealing devices 52 (shown as dashed lines) by the user. Similarly, the unused gas inlet 21 in the inner tank 20 may be sealed through using the water outlet sealing device, not marked in the figure.

In conclusion, the temperature of hydrogen-oxygen gas generated by the electrolytic tank 31 can be decreased through the liquid water of the inner tank 20 to prevent hydrogen explosion. Furthermore, the water level of the inner tank 20 is detected through the water level monitor 25 in the inner tank 20 to adaptively supply the liquid water in a second storage tank, to prevent hydrogen explosion. The storage capacity of hydrogen-oxygen gas stored in the upper portion of the inner tank 20 can be adjusted through the relief valve to automatically depressurize for achieving the effect of preventing hydrogen explosion. Then, in the present invention, the design of the gas outlet and the water inlet of the electrolytic tank 31 and the design of the gas outlet and the water inlet of the inner tank 20 make the pure water in the inner tank 20 be automatically supplied to the electrolytic tank 31, and the hydrogen-oxygen gas generated by the electrolytic tank 31 can be automatically discharged to the inner tank, and then to achieve the gas-water circulation. Then, the temperature of the hydrogen-oxygen gas generated by the electrolytic module 30 will be further cooled through immersing the electrolytic module 30 in the coolant of the outer tank 10 to increase the safety of the present invention. At the same time, the detachable design of the electrolytic tank 31 may be freely increase and decrease the number of electrolytic tanks by the user according to their need.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the meets and bounds of the appended claims.

The invention claimed is:

1. A modular health gas generator, comprising:
   a power source;
   a first conductive element and a second conductive element, electrically connected to the power source;
   an inner tank, having a hollow portion for accommodating a liquid water;
   an electrolytic module for electrolyzing the liquid water to generate a hydrogen-oxygen gas, the electrolytic module comprising a plurality of electrolytic tanks, and a tank shelf, each electrolytic module having an electrode plate and a tank body, the tank shelf comprises a plurality of first longitudinal perforations, the tank body of each electrolytic tank is correspondingly configured within one of the first longitudinal perforations of the tank shelf;
   a transfusion pipe, connected to the inner tank and the electrolytic module, whereby the inner tank can supply the liquid water to the electrolytic tank; and
   a gas pipe, connected to the electrolytic module and the inner tank, whereby the hydrogen-oxygen gas generated by the electrolytic module can be outputted to the inner tank;
   wherein the electrode plate of each electrolytic module is electrically connected to the first conductive device, and the tank body of each electrolytic module is electrically connected to the second conductive device.

2. The modular health gas generator of claim 1, wherein the electrolytic module further comprises an electrode shelf, the electrode shelf comprises a plurality of second longitudinal perforations, the electrode plate of each electrolytic tank is correspondingly configured to the one of the second longitudinal perforations of the electrode plate, and the under portion of the electrode plate is configured within the tank body of the electrolytic tank.

3. The modular health gas generator of claim 2, wherein the tank shelf comprises at least one third lateral perforation and a first cylinder, the tank body of the electrolytic tank comprises at least one first lateral perforation, the third lateral perforation of the tank shelf and the first lateral perforation of the tank body are penetrated through by the first cylinder.

4. The modular health gas generator of claim 3, wherein the under portion of the electrode plate has a second lateral perforation for proving the first cylinder of the tank shelf to penetrate through.

5. The modular health gas generator of claim 3, wherein the electrode shelf comprises at least one fourth lateral perforation and a second cylinder, the upper portion of the electrode plate comprises a second lateral perforation, the fourth lateral perforation of the electrode shelf and the second lateral perforation of the upper portion of the electrode plate are penetrated through by the second cylinder.

6. The modular health gas generator of claim 3, wherein the electrode shelf comprises at least one fourth lateral perforation and a second cylinder, the upper portion of the electrode plate is an inverted U-shape and comprises a head portion and a neck portion, the head portion and the neck portion of the upper portion of the electrode plate have a second lateral perforation respectively, the fourth lateral perforation of the electrode shelf and the second lateral perforations of the head portion and the neck portion of the upper portion of the electrode plate are penetrated through by the second cylinder respectively.

7. The modular health gas generator of claim 2, wherein each electrolytic tank further comprises a cover body, the cover body has a longitudinal opening for providing the under portion of the electrode of the electrolytic tank to penetrate through, and the cover body covers the tank body.

8. The modular health gas generator of claim 2, wherein the tank shelf comprises a first cylinder, the tank body is penetrated through by the first cylinder, the electrode shelf comprises a second cylinder, and the upper portion of the electrode plate is penetrated through by the second cylinder.

9. The modular health gas generator of claim 1, wherein the electrode plate of each electrolytic tank is an anode, and the tank body of each electrolytic tank is a cathode.

10. The modular health gas generator of claim 1, wherein an operating voltage of each electrolytic tank is between 24 volt and 4 volt.

11. A modular health gas generator, comprising:
    an electrode tank module comprising a plurality of detachable electrolytic tanks, each electrolytic tank comprising a tank body and an electrode plate, the electrode plate of each electrolytic tank being an anode, and the tank body of each electrolytic tank being a cathode; and
    an inner tank for supplying a liquid water to the plurality of electrolytic tanks;
    wherein the anode of each electrolytic tank is electrically connected to each other, the cathode of each electrolytic tank is connected to each other, whereby the plurality of electrolytic tanks of the electrolytic module are connected in parallel;
    wherein the electrode tank module further comprises a tank shelf and an electrode shelf, the tank shelf comprises a plurality of first longitudinal perforations, the tank body of each electrolytic tank is correspondingly configured within one of the first longitudinal perforations of the tank shelf.

12. The modular health gas generator of claim 11, wherein the tank shelf comprises a first cylinder, the under portion of the electrode plate of each electrolytic tank has a second lateral perforation and an isolated piece, the second lateral perforation of the under portion of the electrode plate is used for providing the first cylinder of the tank shelf to penetrated through, and the isolated piece can prevent the tank body of the tank shelf from conducting the electrode plate.

13. The modular health gas generator of claim 11, wherein an upper portion of each electrode plate is fixed and locked in the electrode shelf and is electrically connected to the electrode shelf.

14. The modular health gas generator of claim 11, wherein an operating voltage of each electrolytic tank is between 24 volt and 5 volt, and an operating current of each electrolytic tank is between 40 amp and 100 amp.

15. A modular health gas generator, comprising:
a plurality of electrolytic tanks for electrolyzing a liquid water to generate a hydrogen-oxygen gas, each electrolytic tank comprises a tank body and an electrode plate, the electrode plate of each electrolytic tank is the anode, and the tank body of each electrolytic tank is the cathode;
a control unit selectively and electrically connected the entire or the part of electrolytic tanks in parallel; and
a tank shelf comprises a plurality of first longitudinal perforations, the tank body of each electrolytic tank is correspondingly configured within one of the first longitudinal perforations of the tank shelf.

16. The modular health gas generator of claim 15 further comprising an inner tank for supplying the liquid water to the plurality of electrolytic tank and receiving the hydrogen-oxygen gas generated by the electrolytic tank, wherein the entire or the part of the plurality of electrolytic tanks are electrically connected in parallel, and an operating voltage of each electrolytic tank is between 12 volt and 4 volt.

17. The modular health gas generator of claim 15, wherein the entire or the part of the plurality of electrolytic tanks are electrically connected in parallel, the anode of each electrolytic tank is electrically connected to a first conductive device, and the cathode is electrically connected to a second conductive device, the first conductive device and the second conductive device are connected to a power source.

* * * * *